United States Patent
Lee et al.

(10) Patent No.: US 10,633,530 B2
(45) Date of Patent: Apr. 28, 2020

(54) RESIN COMPOSITION FOR OPTICAL MATERIAL AND OPTICAL FILM COMPRISING THE SAME

(71) Applicant: LG Chem, Ltd., Seoul (KR)

(72) Inventors: Joong Hoon Lee, Daejeon (KR); Sei Jung Park, Daejeon (KR); Sung Ho Hwang, Daejeon (KR); Byoung Jun Mun, Daejeon (KR); Heon-Sik Song, Daejeon (KR)

(73) Assignee: LG Chem, Ltd. (KR)

( * ) Notice: Subject to any disclaimer, the term of this patent is extended or adjusted under 35 U.S.C. 154(b) by 12 days.

(21) Appl. No.: 15/765,298

(22) PCT Filed: Aug. 8, 2017

(86) PCT No.: PCT/KR2017/008566
§ 371 (c)(1),
(2) Date: Apr. 2, 2018

(87) PCT Pub. No.: WO2018/030759
PCT Pub. Date: Feb. 15, 2018

(65) Prior Publication Data
US 2018/0273742 A1    Sep. 27, 2018

(30) Foreign Application Priority Data

Aug. 9, 2016  (KR) .......................... 10-2016-0101417
Jul. 28, 2017  (KR) .......................... 10-2017-0096362

(51) Int. Cl.
*C08L 33/12*    (2006.01)
*G02B 1/14*     (2015.01)
(Continued)

(52) U.S. Cl.
CPC .............. *C08L 33/12* (2013.01); *B29C 55/12* (2013.01); *C08J 5/18* (2013.01); *C08K 5/09* (2013.01);
(Continued)

(58) Field of Classification Search
CPC ... C08L 33/12; G02B 1/14; C08J 5/18; B29C 55/143
See application file for complete search history.

(56) References Cited

U.S. PATENT DOCUMENTS

| 4,743,654 A | 5/1988 | Kyu et al. |
| 2010/0182689 A1 | 7/2010 | Nakanishi et al. |

(Continued)

FOREIGN PATENT DOCUMENTS

| EP | 1153981 A2 | 11/2001 |
| JP | 2010274505 A | 12/2010 |

(Continued)

OTHER PUBLICATIONS

International Search Report for Application No. PCT/KR2017/008566 dated Nov. 28, 2017.
(Continued)

*Primary Examiner* — Bijan Ahvazi
(74) *Attorney, Agent, or Firm* — Lerner, David, Littenberg, Krumholz & Mentlik, LLP

(57) ABSTRACT

The resin composition for an optical material according to the present invention has features that it can implement a low retardation value during the preparation of an optical film, by using a polycarbonate composition satisfying a specific condition as a retardation-adjusting agent while using polymethyl methacrylate not containing a monomer having a cyclic structure at the main chain of the polymer.

12 Claims, 1 Drawing Sheet

(51) Int. Cl.
*C08J 5/18* (2006.01)
*B29C 55/12* (2006.01)
*G02B 5/30* (2006.01)
*C08L 69/00* (2006.01)
*G02F 1/13363* (2006.01)
*C08K 5/09* (2006.01)
*B29C 55/14* (2006.01)
*B29K 33/00* (2006.01)
*B29K 69/00* (2006.01)
*B29L 11/00* (2006.01)

(52) U.S. Cl.
CPC ............... *C08L 69/00* (2013.01); *G02B 1/14* (2015.01); *G02B 5/30* (2013.01); *G02F 1/13363* (2013.01); *B29C 55/143* (2013.01); *B29K 2033/12* (2013.01); *B29K 2069/00* (2013.01); *B29K 2995/0034* (2013.01); *B29K 2995/0053* (2013.01); *B29L 2011/0066* (2013.01); *C08J 2333/12* (2013.01); *C08J 2469/00* (2013.01); *C08L 2203/16* (2013.01); *G02B 5/3025* (2013.01)

(56) References Cited

U.S. PATENT DOCUMENTS

| | | |
|---|---|---|
| 2010/0292368 A1 | 11/2010 | Takebe et al. |
| 2011/0128478 A1* | 6/2011 | Yamada ............... B32B 23/08 349/96 |
| 2011/0245421 A1 | 10/2011 | Dufaure et al. |
| 2013/0314785 A1* | 11/2013 | Kang ............... G02B 1/105 359/485.01 |
| 2014/0268333 A1* | 9/2014 | Tanaka ............... G02B 1/08 359/489.07 |
| 2016/0237230 A1 | 8/2016 | Sasata et al. |
| 2016/0245970 A1* | 8/2016 | Um ............... G02B 1/04 |
| 2017/0010390 A1 | 1/2017 | Nakahara et al. |
| 2017/0183463 A1 | 6/2017 | Nakahara et al. |

FOREIGN PATENT DOCUMENTS

| | | |
|---|---|---|
| JP | 2012051997 A | 3/2012 |
| JP | 2012082358 A | 4/2012 |
| JP | 5430187 B2 | 2/2014 |
| JP | 2015160941 A | 9/2015 |
| JP | 2015165017 A | 9/2015 |
| KR | 100725934 B1 | 5/2007 |
| KR | 101045184 B1 | 6/2011 |
| KR | 101175425 B1 | 8/2012 |
| KR | 101347021 B1 | 1/2014 |
| KR | 20140020763 A | 2/2014 |
| KR | 101471228 B1 | 12/2014 |
| KR | 20150019005 A | 2/2015 |
| KR | 20150039089 A | 4/2015 |
| KR | 20160014529 A | 2/2016 |
| WO | 2015047005 A1 | 4/2015 |
| WO | 2015064732 A1 | 5/2015 |
| WO | 2015111682 A1 | 7/2015 |
| WO | 2015159552 A1 | 10/2015 |
| WO | 2015162926 A1 | 10/2015 |

OTHER PUBLICATIONS

Extended European Search Report including Written Opinion for Application No. EP17839777 dated Jun. 15, 2018.

* cited by examiner

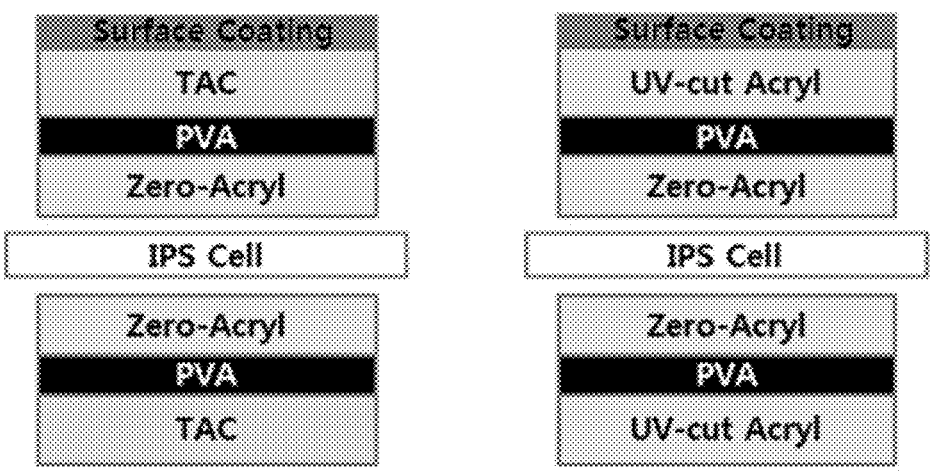

RESIN COMPOSITION FOR OPTICAL MATERIAL AND OPTICAL FILM COMPRISING THE SAME

CROSS-REFERENCE TO RELATED APPLICATIONS

This application is a national phase entry under 35 U.S.C. § 371 of International Application No. PCT/KR2017/008566, filed Aug. 8, 2017, which claims priority to Korean Patent Application No. 10-2016-0101417, filed Aug. 9, 2016 and Korean Patent Application No. 10-2017-0096362, filed Jul. 28, 2017, the disclosures of which are incorporated herein by reference.

TECHNICAL FIELD

The present invention relates to a resin composition for optical material and an optical film comprising the same.

BACKGROUND ART

A liquid crystal display device uses polarized light. To this end, a polarizing plate is used, and a PVA element is typically used. However, a polarizing plate such as a PVA element has weak mechanical properties and is easily influenced by an external environment such as temperature and humidity. Thus, a protective film for protecting the polarizing plate is required.

Such a protective film should have not only excellent optical properties but also excellent mechanical properties. A TAC film (Tri-Acetyl-cellulose Film) has been commonly used as a protective film of a PVA element used for a polarizing plate, but in recent years, an acrylic film having more excellent heat resistance and absorption resistance properties as compared to the TAC film is used.

The acrylic films for protecting the polarizing plate are prepared through stretching process. The acrylic resin having a glass transition temperature of 120° C. or higher is generally used so that the dimensional change at a high temperature is small and the optical properties are stably maintained. In addition, in order to further improve dimensional stability and optical properties of the acrylic resin, a monomer having a cyclic structure imparting heat resistance is introduced. However, when a monomer having a cyclic structure is introduced, there is a problem that not only the unit price of the raw material is increased but also the processing must be performed at a higher temperature.

On the other hand, although polymethyl methacrylate (PMMA) is excellent in transparency and thus can be used as a polarizing plate protective film, it has a low glass transition temperature, which causes a problem that, during use at a high temperature, a stretching history is loosened and a dimensional stability is deteriorated. In addition, for the purpose of using it as a polarizing plate protective film for IPS mode, another retardation-adjusting agent must be added in order to realize a low retardation value, and the retardation-adjusting agent used herein must have excellent compatibility with polymethyl methacrylate and must be included in an appropriate amount for implementing a low retardation value.

Further, when a film is produced by stretching polymethyl methacrylate, the stretched film has a negative birefringence property in which the refractive index becomes large in a direction perpendicular to the stretching direction. Therefore, the retardation-adjusting agent used for implementing a low retardation value should have a positive birefringence property in which the refractive index in the stretching direction becomes large. Polycarbonate, polyester, phenoxy resin and the like are known as materials having such positive birefringence property, but most of them have a disadvantage that compatibility with polymethyl methacrylate is poor.

Accordingly, the present inventors have made extensive and intensive studies to produce a resin composition for optical material capable of realizing a low retardation value while using polymethyl methacrylate not including a cyclic monomer in a polymer main chain. As a result, it has been found that the resin composition for optical material containing a specific amount of methacrylic acid monomer at the terminal of the polymethyl methacrylate and containing the polycarbonate as a retardation-adjusting agent exhibits the above-mentioned properties, thereby completing the present invention.

DETAILED DESCRIPTION OF THE INVENTION

Technical Problem

It is one object of the present invention to provide a resin composition for optical material not only having excellent transparency and heat resistance but also having a low retardation value, and a film containing the same.

It is another object of the present invention to provide a polarizing plate comprising the optical film.

Technical Solution

In order to achieve the above objects, the present invention provides a resin composition for optical material, comprising 1) 90% to 99% by weight of polymethyl methacrylate; and 2) 1% to 10% by weight of polycarbonate, wherein the polymethyl methacrylate includes methacrylic acid monomer in an amount of 1% to 5% by weight based on the total weight of the polymethyl methacrylate, the polymethyl methacrylate has a glass transition temperature of 100° C. or more and less than 120° C., the polycarbonate has a glass transition temperature of 125° C. or more and less than 135° C., and the glass transition temperature difference between the polymethyl methacrylate and the polycarbonate is less than 20° C.

Polymethyl methacrylate (PMMA) is excellent in transparency and thus can be used as an optical film, particularly, a polarizing plate protective film. However, when polymethyl methacrylate is used as a film, a stretching process should be used in order to increase mechanical strength. Since polymethyl methacrylate has a low glass transition temperature, an optical film produced using the polymethyl methacrylate has a low glass transition temperature, which causes a problem that, during use at a high temperature, a stretching history is loosened and a dimensional stability is deteriorated. In order to solve this problem, there has been proposed a method of introducing a monomer having a cyclic structure into the main chain of a polymethyl methacrylate polymer. However, since the production process is complicated, the unit price of the raw material is increased, and the process must be performed at a higher temperature, whereby there is a problem that the terminal groups of the polymer are decomposed or the low molecular weight additives are thermally decomposed.

In addition, when polymethyl methacrylate is stretched, it has a negative birefringence property in which the refractive index becomes large in a direction perpendicular to the stretching direction. Therefore, in order to have a low retardation value like the polarizing plate protective film for IPS mode, the retardation-adjusting agent having a positive birefringence property in which the refractive index in the stretching direction becomes large is required.

Therefore, the present invention provides a resin composition for optical material capable of implementing a low retardation value by using polymethyl methacrylate as described later and polycarbonate as a retardation-adjusting agent.

The present invention will be described in more detail below.

Polymethyl Methacrylate

The term "polymethyl methacrylate (PMMA)" as used herein means a polymer containing methyl methacrylate (MMA) as a monomer, and particularly in the present invention, the polymethyl methacrylate (PMMA) is a main component of in the resin composition and refers to containing 1 to 5% by weight of a methacrylic acid monomer at its terminal. The methacrylic acid serves to adjust the glass transition temperature by inhibiting the decomposition of the copolymer.

Further, the glass transition temperature of the polymethyl methacrylate is 100° C. or more and less than 120° C., preferably 110° C. or more and 117° C. or less. When the glass transition temperature is less than 100° C., there is a problem that the thermal stability decreases when the film has been produced. Further, in the case where the glass transition temperature is 120° C. or more, it has heat resistance of 120° C. or more when a special monomer having a cyclic structure is introduced in the main chain of polymethyl methacrylate as described above, or when the tacticity of the acrylic polymer chain is specifically adjusted in the polymerization step. Therefore, the unit cost of the raw material increases, and thermal decomposition or the like due to a high processing temperature occurs, resulting in a decrease in processability of the film.

The polymethyl methacrylate can be produced by a known method except that methacrylic acid is used in addition to methyl methacrylate, and examples thereof include methods such as an emulsion polymerization, an emulsion-suspension polymerization, and a suspension polymerization. Further, in order to introduce the methacrylic acid monomer in the terminal of the polymethyl methacrylate, the polymethyl methacrylate is first polymerized, and then the methacrylic acid monomer may be polymerized.

Further, the weight average molecular weight of the polymethyl methacrylate is 100,000 to 160,000. When the weight average molecular weight is less than 100,000, there is a problem that mechanical properties are deteriorated when prepared into a film. When the weight average molecular weight exceeds 160,000, there is a problem that stretching is difficult.

Polycarbonate

The term "polycarbonate" as used herein is formed by reacting an aromatic diol compound and a carbonate precursor, and can be prepared by interfacial polymerization or solution polymerization. As an example, it can be prepared by interfacial polymerization of bisphenol A and phosgene.

The polycarbonate is added for retardation adjustment, and the glass transition temperature of the polycarbonate should correspond to that of the polymethacrylate for achieving compatibility with the polymethacrylate, processability of the optical film, and physical properties of the optical film. Preferably, the polycarbonate has a glass transition temperature of at least 125° C. and less than 135° C.

When the glass transition temperature is lower than 125° C., the MI of the polycarbonate becomes too low to be pelletized, and the polymerization efficiency becomes poor, making it difficult to produce. In addition, when the glass transition temperature is 135° C. or higher, compatibility with the acrylic resin of the present invention is deteriorated and a transparent film cannot be obtained, which is not preferable.

It is also desirable to use a polycarbonate having a glass transition temperature difference between the polymethyl methacrylate and the polycarbonate of less than 20° C. More preferably, the glass transition temperature difference is 19° C. or less. If the glass transition temperature difference is 20° C. or higher, the compatibility with polymethyl methacrylate decreases and it becomes an opaque composition as a whole, which is not preferable.

Further, the polycarbonate is contained preferably in an amount of 1% by weight to 10% by weight in the resin composition for optical material. If the content of the polycarbonate is less than 1% by weight, the negative birefringence property becomes too large to achieve zero retardation. Conversely, if the content of the polycarbonate exceeds 10% by weight, the positive birefringence property becomes too large. Thereby, it becomes difficult to achieve zero retardation and there is a problem that the compatibility with acrylic becomes worse and transparency is deteriorated.

Resin Composition for Optical Material

The resin composition for optical material according to the present invention comprises 90% to 99% by weight of the above-mentioned polymethyl methacrylate, and 1% to 10% by weight of a polycarbonate.

Further, the resin composition for optical material can be produced by melt-kneading the above polymethyl methacrylate and polycarbonate composition.

Further, the resin composition for optical material may contain an additive such as an ultraviolet absorber, a heat stabilizer, and a lubricant, if necessary. In this case, the additives may be contained in an appropriate amount within a range that does not deteriorate the physical properties of the resin composition. For example, the additives may be included in an amount of 0.1 to 5 parts by weight based on 100 parts by weight of the entire resin composition for optical material.

Optical Film

In addition, the present invention provides an optical film comprising the resin composition for optical material described above. The term "optical film" as used herein means a film produced by stretching the above-mentioned resin composition for optical material.

In the production of the optical film according to the present invention, any method known in the art can be used, for example, a solution castor method, an extrusion method, or the like can be used. As an example, a melt extrusion molding method can be used. Specifically, the resin composition for optical material is vacuum-dried to remove water and dissolved oxygen, and then supplied from a raw material hopper to a single or twin-screw extruder in which the extruder is replaced with nitrogen. The raw material pellets are obtained by melting at a high temperature. The obtained raw material pellets are vacuum-dried, melted by a single extruder in which from the raw hopper to the extruder is substituted with nitrogen, passed through a coat hanger type T-die, and a film can be produced through a chrome plating casting roll, a drying roll and the like. At this time, the film forming temperature is preferably 150° C. to 350° C., more preferably 200° C. to 300° C. Meanwhile, in the case of forming a film by the T-die method as described above, a T-die is attached to the tip of a known single-screw extruder or a twin-screw extruder and a film extruded into a film shape is wound to obtain a rolled film.

In particular, it is preferable that the optical film according to the present invention is prepared by biaxially stretching the film produced from the above-mentioned resin composition for optical material by 1.5 times to 2.5 times in the MD direction and by 1.5 times to 3.0 times in the TD direction. The stretching aligns the molecules of the polymer contained in the composition for optical material, and affects the properties of the optical film produced according to the degree of stretching. More preferably, the ratio of the MD stretching magnification factor and the TD stretching magnification factor (TD stretch ratio/MD stretch ratio) is 1.05 or more and 1.70 or less.

Further, the stretching temperature is preferably 10° C. to 30° C. higher than the glass transition temperature of the polymethyl methacrylate. The optical film according to the present invention is excellent in dimensional stability, and a variable called TTS (Temperature of Thermal Shrinkage) is introduced to evaluate the thermal dimensional stability. TTS means a temperature at which the optical film produced by the stretching process starts shrinking sharply as the stretching history is loosened. Specifically, it refers to a temperature at which the optical film starts shrinking after expansion when the temperature increases.

Preferably, the TTS in the MD direction and the TTS in the TD direction of the optical film according to the present invention are respectively 100° C. to 120° C.

In addition, the optical film according to the present invention can improve the properties which are easily broken because it is produced by orienting a polymer chain through a biaxial stretching process. Specifically, the optical film according to the present invention has a feature that the impact energy value of the following Equation 1 is 400 kN·m/m$^3$ or more:

Impact energy=(gravitational acceleration×weight of falling-ball×height of falling-ball)/(thickness of optical film×area of optical film)  [Mathematical Equation 1]

A specific method of measuring the impact energy can be carried out in the following embodiments. For example, in the following examples, 16.4 g of a falling-ball is used for the measurement of the impact energy, and the maximum height of the ball which withstands without being broken more than 8 times when the ball is freely fallen 10 times or more in total is calculated as the height of the falling-ball.

Meanwhile, the thickness of the optical film according to the present invention can be suitably adjusted as needed, and is preferably, for example, 10 μm to 100 μm.

Further, preferably, the optical film according to the present invention exhibits the following retardation:

0 nm≤Rin≤10 nm (Rin=(nx−ny)×d)  [Mathematical Equation 2]

−10 nm≤Rth≤10 nm (Rth=((nx+ny)/2−nz)×d)  [Mathematical Equation 3]

in Mathematical Equations 2 and 3, nx, ny, and nz represent the refractive indices in the x-axis direction, the y-axis direction and the z-axis direction, respectively, and d means the thickness (nm) of the optical film.

The retardation means that a low retardation value is satisfied. A low retardation value can be realized by using polymethyl methacrylate and polycarbonate as a retardation-adjusting agent as described above.

The present invention also provides a polarizing plate comprising the optical film. As described above, the optical film according to the present invention can be used as a protective film for a polarizing plate, thereby compensating the mechanical properties of the polarizing plate and protecting the polarizing plate from the influence of the external environment, for example, from temperature or humidity.

Specifically, the optical film according to the present invention may be attached to one side or both sides of a polarizing plate and used as a polarizing plate protective film. When the optical film according to the present invention is applied to a liquid crystal display device, the optical film according to the present invention can be used between the polarizing plate and the liquid crystal cell. In this case, the liquid crystal cell and the polarizing plate can be simultaneously protected. An example thereof is shown in the FIGURE. As illustrated the FIGURE, it can be arranged in the order of the polarizing element/protective film/liquid crystal cell/protective film/polarizing element. On the other surface of each polarizing element, a TAC film or an acrylic film can be used as a protective film without limitation.

Advantageous Effects

As described above, the resin composition for optical material according to the present invention has features that it can implement a low retardation value during the preparation of an optical film, by using polycarbonate as a retardation-adjusting agent while using polymethyl methacrylate not containing a monomer having a cyclic structure.

BRIEF DESCRIPTION OF DRAWINGS

The FIGURE schematically shows an example in which a protective film according to the present invention is used.

DETAILED DESCRIPTION OF THE EMBODIMENTS

Hereinafter, preferred examples of the present invention will be described in order to facilitate understanding of the present invention. However, the examples below are provided only for a better understanding of the present invention, and the present invention is not limited thereby.

Preparation Example 1: Polymethyl Methacrylate 1,000 g of a monomer mixture of 98 wt % methyl methacrylate and 2 wt % methyl acrylate was added to a 5 liter reactor to which 2,000 g of distilled water, 8.4 g of 5% polyvinyl alcohol solution (POVAL PVA217, Kuraray Co.) and 0.1 g of boric acid as a dispersion assistant were added and dissolved. Here, 2.5 g of n-octyl mercaptane as a chain transfer agent and 1.5 g of 2,2'-azobisisobutyronitrile as a polymerization initiator were added and dispersed in water while stirring at 400 rpm to obtain a suspension. The temperature was raised to 80° C. and polymerized for 90 minutes, and then cooled to 30° C. The obtained beads were washed with distilled water, dehydrated, and then dried to prepare a polymethyl methacrylate resin. As a result of the measurement of the glass transition temperature and molecular weight of the produced resin, the glass transition temperature was 116° C. and the weight average molecular weight was 120,000. The glass transition temperature was measured using a differential scanning calorimeter (DSC) manufactured by Mettler Toledo under conditions of temperature raising rate of 10° C./min.

Preparation Example 2: Polycarbonate

A polycarbonate resin having a glass transition temperature of 134° C. (UF 1004 A, LG Chem Ltd., hereinafter referred to as "PC-1"), a polycarbonate resin having a glass transition temperature of 143° C. (LUPOY 1080 DVD, LG Chem Ltd., hereinafter referred to as "PC-2") and a polycarbonate resin having a glass transition temperature of 148° C. (UF 1004C, LG Chem Ltd., hereinafter referred to as "PC-3") were used as the polycarbonate.

Example 1

95 wt % of polymethyl methacrylate prepared in Preparation Example 1 and 5 wt % of PC-1 were mixed, and an antioxidant (Irganox 1010, manufactured by BASF) was formulated in an amount of 0.5 phr, dry-blended, and the mixture was compounded in a twin-screw extruder to prepare a resin composition. The resin composition was melted at 265° C. and extruded in the form of a sheet through a T-die to obtain a sheet of 180 um.

Comparative Example 1

A sheet was obtained in the same manner as in Example 1, except that 85 wt % of polymethyl methacrylate prepared in Preparation Example 1 and 15 wt % of PC-1 were mixed.

Comparative Example 2

A sheet was obtained in the same manner as in Example 1, except that 95 wt % of polymethyl methacrylate prepared in Preparation Example 1 and 5 wt % of PC-2 were mixed.

Comparative Example 3

A sheet was obtained in the same manner as in Example 1, except that 95 wt % of polymethyl methacrylate prepared in Preparation Example 1 and 5 wt % of PC-3 were mixed.

Comparative Example 4

An antioxidant (Irganox 1010, manufactured by BASF) was formulated into the polymethyl methacrylate prepared in Preparation Example 1 in an amount of 0.5 phr, dry-blended and compounded with a twin-screw extruder to prepare a resin composition. The resin composition was melted at 265° C. and extruded in the form of a sheet through a T-die to obtain a sheet of 180 um.

Experimental Example 1

The properties of the sheets obtained in Examples and Comparative Examples were evaluated as follows.

1) Glass transition temperature difference (ΔTg): The difference between the glass transition temperature of polycarbonate (PC-1, PC-2 or PC-3) and the glass transition temperature of polymethyl methacrylate was calculated.

2) Total light transmittance (Tt): Total light transmittance of the sheet was measured using a turbidimeter.

3) Haze: Measured using Hazemeter HM-150.

The results are shown in Table 1 below.

As shown in Table 1, in Example 1, the glass transition temperature difference was less than 20° C. and the content of polycarbonate was 10 wt % or less. Thereby, the transparent sheet having excellent total light transmittance and haze value was prepared. Meanwhile, in Comparative Example 1, the glass transition temperature difference was less than 20° C., but the content of polycarbonate was 10 wt % or more. Thereby, an opaque sheet having a low total light transmittance and a large haze value was prepared. In Comparative Examples 2 and 3, the content of polycarbonate was 10 wt % or less, but the glass transition temperature difference was 20° C. or more. Thereby, an opaque sheet was prepared. In Comparative Example 4, a transparent sheet having good total light transmittance and haze value was produced without adding a polycarbonate resin.

Experimental Example 2

In Experimental Example 1, the following experiments were carried out using the sheets of Example 1 and Comparative Example 4 in which transparent sheets were produced.

The sheet of Example 1 was biaxially stretched at a stretching temperature and a stretching magnification as described in the following Table 2 to produce optical films (Examples 2 to 7). Further, the sheet of Comparative Example 4 was biaxially stretched at a stretching temperature and a stretching magnification as described in Table 2 below to prepare an optical film (Comparative Example 5). For comparison, the sheet of Example 1 which was not biaxially stretched was set as Comparative Example 6.

The optical films thus prepared were evaluated for their properties as described below.

1) TTS (Temperature of Thermal Shrinkage): A sample of optical film was measured at a size of 80×4.5 mm and measured using a TA TMA (Q400) instrument. Specifically, when the temperature was applied under the conditions of a temperature raising rate of 10° C./min and a load of 0.02 N, the temperature (tangent slope of 0) of the inflection point at which the sample starts shrinking after expansion in the MD and TD directions, respectively.

2) Retardation: The retardation was measured at a wavelength of 550 nm using a birefringence meter (AxoScan, Axometrics). The in-plane retardation Rin and the thickness direction retardation Rth are calculated as the measured values of a refractive index nx in the x-axis direction, a refractive index ny in the y-axis direction, and a refractive index nz in the z-axis direction.

$$Rin\ (nm) = (nx - ny) \times d$$

$$Rth\ (nm) = ((nx + ny)/2 - nz) \times d$$

TABLE 1

| | | Ex. 1 | Comparative Ex. 1 | Comparative Ex. 2 | Comparative Ex. 3 | Comparative Ex. 4 |
|---|---|---|---|---|---|---|
| Composition of resin composition (wt %) | Polymethyl methacrylate | 95 | 85 | 95 | 95 | 100 |
| | PC-1 | 5 | 15 | — | — | — |
| | PC-2 | — | — | 5 | — | — |
| | PC-3 | — | — | — | 5 | — |
| Glass transition temperature difference (° C.) | | 19 | 19 | 32 | 29 | — |
| Optical properties | Tt(%) | 92 | 81 | 74 | 74 | 92 |
| | Haze(%) | 0.3 | 5.2 | 6.6 | 6.8 | 0.2 | wherein, d means the thickness (nm) of the optical film.

3) Heat shrinkage: A sample for optical film was measured with a size of 20×200 mm, and then the length of the sample changed relative to its initial length after being maintained in an oven at 85° C. for 100 hours was measured. The changed length was taken as the value of dimensional change as a percentage value relative to the initial length.

4) Impact strength (kN·m/m³): The thickness of the optical film was measured, and the film was placed in a circular frame having a diameter of 76 mm. Then, the film was allowed to fall freely while changing its height using a circular ball (iron beads) weighing 16.4 g, and it was confirmed whether the optical film was broken. The breakage of the optical film was judged by whether the film withstands without being destroyed more than 8 times when it was allowed to fall freely 10 times at the same height. The impact energy value of the optical film was calculated according to the following equation using the maximum height withstanding at least 8 times.

Impact energy=(gravitational acceleration×weight of falling-ball×height of falling-ball)/(thickness of polarizing plate protective film×area of film)

The results are shown in Table 2 below.

TABLE 2

| Unit | Resin composition | Stretching temperature ° C. | Stretching magnification (MD/TD) ×times | TTS (MD/TD) ° C. | Rin/Rth nm/nm | Thermal shrinkage (MD/TD) % | Impact Energy kN · m/m³ |
|---|---|---|---|---|---|---|---|
| Ex. 2 | Ex. 1 | 131 | 1.8 × 2.6 | 105/103 | 1.8/2.4 | 0.43/0.53 | 418 |
| Ex. 3 | | 131 | 1.7 × 3.0 | 108/99 | 3.2/2.8 | 0.38/0.91 | 452 |
| Ex. 4 | | 136 | 1.8 × 2.6 | 108/106 | 1.5/2.1 | 0.41/0.50 | 360 |
| Ex. 5 | | 136 | 1.7 × 3.0 | 109/102 | 2.2/2.5 | 0.37/0.72 | 401 |
| Ex. 6 | | 126 | 1.8 × 2.6 | 99/97 | 2.6/2.3 | 0.82/0.96 | 474 |
| Ex. 7 | | 126 | 1.7 × 3.0 | 101/94 | 3.4/1.2 | 0.78/1.18 | 493 |
| Comparative Ex. 5 | Comparative Ex. 4 | 131 | 1.8 × 2.6 | 105/104 | 2.1/18.2 | 0.48/0.61 | 409 |
| Comparative Ex. 6 | Ex. 1 | — | — | — | 1.2/1.9 | 0.01/0.00 | 107 |

As shown in Table 2, when the resin composition of Example 1 was used, it was confirmed that it exhibited a low retardation property under any stretching conditions. On the other hand, when the optical film was prepared by using only polymethyl methacrylate as in the resin composition of Comparative Example 4, it was confirmed that the retardation value Rth was high. Moreover, when biaxial stretching was not performed as in Comparative Example 6, it was confirmed that the impact energy was low.

Further, when comparing Example 2 and Example 4, it was confirmed that as the stretching temperature was increased at the same stretching magnification, an optical film exhibiting a high TTS value and less dimensional change could be produced. On the other hand, in the case of Examples 3 and 5 where the MD stretching magnification and the TD stretching magnification were large under the same stretching temperature condition, the TTS value in the TD direction with a large stretching magnification becomes small and the heat shrinkage ratio becomes large, thereby curl or bending could be occurred due to shrinkage during preparation of the polarizing plate. In addition, it was confirmed that, in the case of Example 6 and Example 7, in which the stretching temperature was low at the same stretching magnification, the TTS value also decreased and the heat shrinkage ratio also increased.

The invention claimed is:
1. A resin composition for optical material, comprising
1) 90% to 99% by weight of polymethyl methacrylate; and
2) 1% to 10% by weight of polycarbonate,
wherein the polymethyl methacrylate includes methyl acrylate, and
wherein the polymethyl methacrylate does not include a monomer having a cyclic structure,
the polymethyl methacrylate has a glass transition temperature of 100° C. or more and less than 120° C.
the polycarbonate has a glass transition temperature of 125° C. or more and less than 135° C., and
the glass transition temperature difference between the polymethyl methacrylate and the polycarbonate is less than 20° C.

2. The resin composition for optical material according to claim 1, wherein the polymethyl methacrylate has a glass transition temperature of 110° C. or more and 117° C. or less.

3. The resin composition for optical material according to claim 1, wherein the polymethyl methacrylate has a weight average molecular weight of 100,000 to 160,000.

4. An optical film comprising the resin composition for optical material according to claim 1.

5. The optical film according to claim 4, wherein the optical film is prepared by biaxially stretching the film produced from the resin composition for optical material by 1.5 times to 2.5 times in the machine direction (MD) and by 1.5 times to 3.0 times in the transverse direction (TD).

6. The optical film according to claim 5, wherein the ratio of the MD stretching magnification factor and the TD stretching magnification factor (TD stretch ratio/MD stretch ratio) is 1.05 or more and 1.70 or less.

7. The optical film according to claim 5, wherein the stretching is carried out at a temperature of 10° C. to 30° C. higher than the glass transition temperature of the polymethyl methacrylate.

8. The optical film according to claim 4, wherein the temperature of thermal shrinkage (TTS) in the MD direction and the TTS in the TD direction of the optical film are respectively 100° C. to 120° C.

9. The optical film according to claim 4, wherein the optical film has an impact energy value of the following Mathematical Equation 1 of 400 kN·m/m³ or more:

Impact energy=(gravitational acceleration×weight of falling-ball×height of falling-ball)/(thickness of optical film×area of optical film)  [Mathematical Equation 1]

wherein the weight of falling ball is 16.4 grams,
the thickness of optical film is from 10 μm to 100 μm, and
the area of optical film is about 20 mm by about 200 mm.

10. The optical film according to claim 4, wherein the optical film exhibits a retardation of Mathematical Equations 2 and 3:

$$0 \text{ nm} \leq Rin \leq 10 \text{ nm } (Rin=(nx-ny) \times d) \quad \text{[Mathematical Equation 2]}$$

$$-10 \text{ nm} \leq Rth \leq 10 \text{ nm } (Rth=((nx+ny)/2-nz) \times d) \quad \text{[Mathematical Equation 3]}$$

in Mathematical Equations 2 and 3, nx, ny, and nz represent refractive indices in a x-axis direction, a y-axis direction and a z-axis direction, respectively, and d means a thickness (nm) of the optical film.

11. A polarizing plate comprising the optical film according to claim 4.

12. An optical film comprising a resin composition for optical material, wherein the resin composition comprises:
1) 90% to 99% by weight of polymethyl methacrylate; and
2) 1% to 10% by weight of polycarbonate,
wherein the polymethyl methacrylate includes methyl acrylate, and
wherein the polymethyl methacrylate does not include a monomer having a cyclic,
the polymethyl methacrylate has a glass transition temperature of 100° C. or more and less than 120° C.,
the polycarbonate has a glass transition temperature of 125° C. or more and less than 135° C., and
the glass transition temperature difference between the polymethyl methacrylate and the polycarbonate is less than 20° C., wherein the optical film comprises the resin composition, and wherein the optical film exhibits a retardation of Mathematical Equations 2 and 3:

$$0 \text{ nm} \leq Rin \leq 10 \text{ nm } (Rin=(nx-ny) \times d) \quad \text{[Mathematical Equation 2]}$$

$$-10 \text{ nm} \leq Rth \leq 10 \text{ nm } (Rth=((nx+ny)/2-nz) \times d) \quad \text{[Mathematical Equation 3]}$$

in Mathematical Equations 2 and 3, nx, ny, and nz represent refractive indices in an x-axis direction, a y-axis direction and a z-axis direction, respectively, and d means a thickness (nm) of the optical film.

\* \* \* \* \*